(12) United States Patent
Hegde et al.

(10) Patent No.: US 8,442,207 B2
(45) Date of Patent: May 14, 2013

(54) SYSTEM AND METHOD FOR OBSERVING A COMMUNICATION SESSION

(75) Inventors: Mayuresh Hegde, Irving, TX (US);
Parind Poi, Lewisville, TX (US);
Prashant Desai, Land O'Lakes, FL (US); Juan Vasquez, Gibsonton, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 199 days.

(21) Appl. No.: 13/048,605

(22) Filed: Mar. 15, 2011

(65) Prior Publication Data
US 2012/0237016 A1    Sep. 20, 2012

(51) Int. Cl.
*H04M 3/00*     (2006.01)
*H04M 5/00*     (2006.01)

(52) U.S. Cl.
USPC .......... 379/265.01; 379/265.06; 379/309

(58) Field of Classification Search ........... 379/265.01, 379/265.06, 309
See application file for complete search history.

(56) References Cited

U.S. PATENT DOCUMENTS
6,301,246 B1 * 10/2001 Shaffer et al. ............... 370/352

FOREIGN PATENT DOCUMENTS
EP        1093283 A1 *   4/2001

* cited by examiner

*Primary Examiner* — Quynh Nguyen

(57) ABSTRACT

An approach is provided for initiating a service observing session by tracking a number of concurrent service observing sessions to an automatic call distributor, and selectively restricting the number of concurrent sessions based on a predetermined restriction criterion. Each of the service observing sessions is established for a user to monitor a voice call involving an agent.

17 Claims, 12 Drawing Sheets

SYSTEM AND METHOD FOR OBSERVING A COMMUNICATION SESSION

BACKGROUND INFORMATION

Communications service providers are continually challenged to meet the customers' needs, manage customer relationship, and utilize call centers to develop new business and remain competitive. Customers can contact communication service providers via a variety of means—e.g., by calling, emailing, chatting online, visiting websites, faxing, and etc.—in to receive customer support. The monitoring of such communications (or "service observing") is typically used to train agents and observe their performance in dealing with customers to ensure high quality service. Unfortunately, with traditional customer support systems, the capability to monitor is greatly constrained by the number of concurrent monitoring sessions. Also, these systems conventionally utilize plain-old-telephone (POTS) technology, and thus, are inflexible with respect to how users (e.g., supervisors) can perform the monitoring, and to accommodating the many different types of communication sessions.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for initiating a service observing session are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a call center operated by the communication service provider itself, it is contemplated that the approach for providing service observing sessions has other applications. Additionally, the call center may be operated by a third party relative to the organization. Further, the agents may be located on-site, off-site, or a combination thereof.

Figure 1:
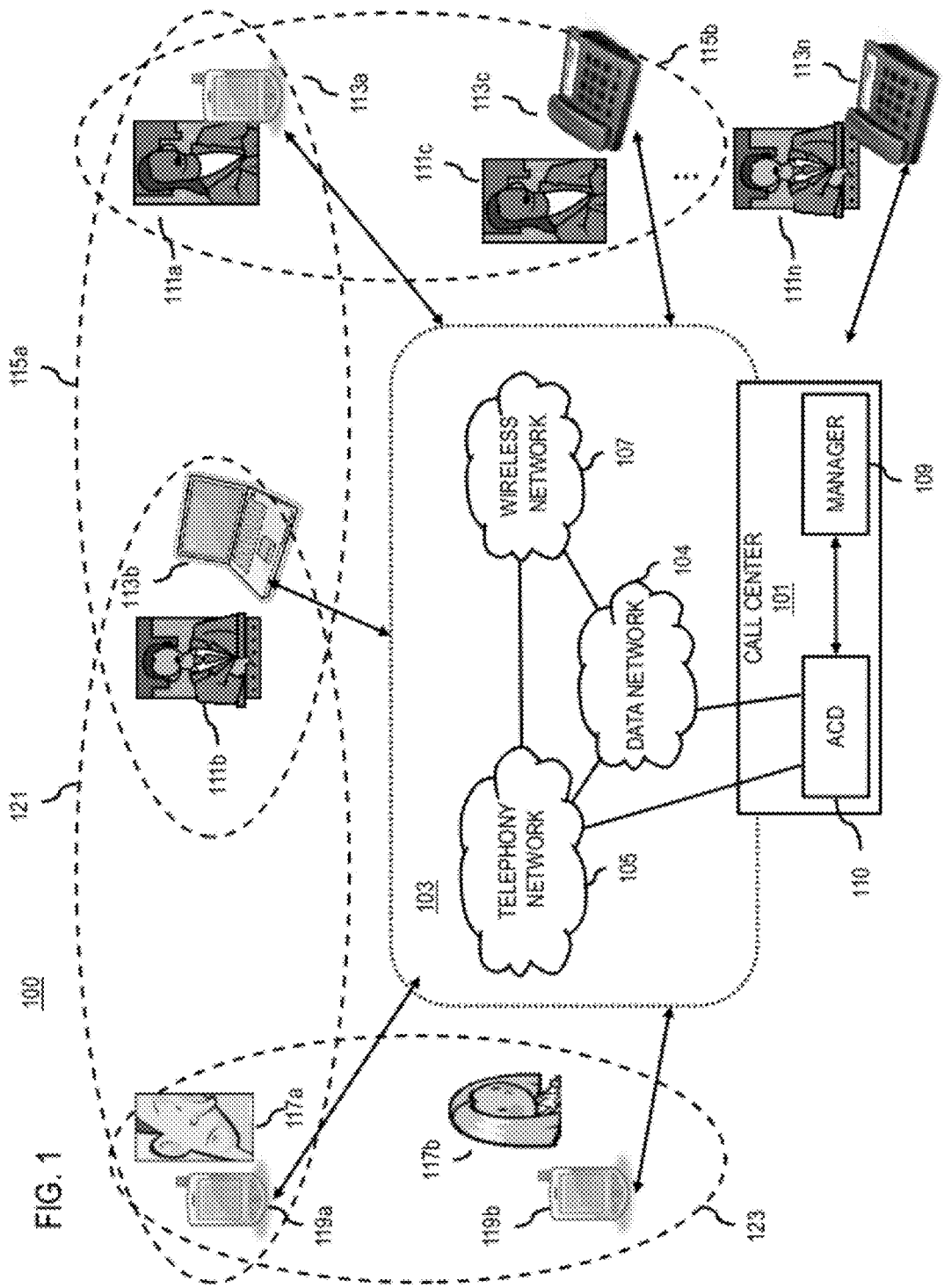
FIG. 1 is a diagram of a system capable of initiating a service observing session, according to an exemplary embodiment.

FIG. 1 is a diagram of a system capable of initiating a service observing session, according to an exemplary embodiment. For the purposes of illustration, system 100 includes a call center 101 that can serve one or more agents distributed across communication system 103 to process various communications between users (e.g., customers) and these agents. In some embodiments, the agents can utilize various forms of communication devices and technologies to create groups for addressing service requirements. As used herein, the term "call center" (in certain embodiments) is a facility and associated service functions provided by, for example, a communication service provider (e.g., a telephone company, an internet telephony service provider, etc.) to support the communication service provider's customer support operations (e.g., administering incoming service/product support or information inquiries from consumers, etc.). It is noted that communication service providers can operate their own call centers, or alternatively, can outsource their customer support and service needs to third party call centers. Call center 101 may be premise-based, virtual, cloud computing based, etc. Similarly, an "agent," as use herein, refers to a staff member associated with the call center that performs the services requested of the call center. An agent may be a call answering staff member (e.g., sale agent, billing agent, technical support agent, etc.), a call monitoring/training staff member (e.g., a supervisor, team leader, manager of a service provider), etc.

The primary interface between a communication service provider and its customers is a service agent. The agents' performance during a customer support call strongly influence the communication service provider's ability to deliver quality service—e.g., addressing the customers' needs. By way of example, an agent's knowledge of product/service offerings, experience and skills to resolve customer issues in real time, and training directly impact the agent's performance. Hence, to ensure that these agents perform well, appropriate monitoring of their activities is needed.

As mentioned, service monitoring of customer support communication sessions play a vital role in ensuring that customers' experiences are to their satisfaction. Conventionally, an observer (e.g., supervisor) can monitor, for instance, calls in progress either via a dedicated phone set or via a toll-free numbers. It is noted that in a typical scenario, the total service observing sessions may exceed third-party resource restrictions, such as a license number of a particular software application for call monitoring. Moreover, business rules (e.g., a call duration, not-to-call list, etc.) can be applied to initiate service observing sessions, to increase customer satisfaction and comply with law and regulation.

Therefore, there is a need for an approach that provides for rapid and efficient establishment of service observing sessions to assist a communications service provider in monitoring and training its agents, while complying with business rules and restrictions on the number of concurrent service observing sessions.

In this example, communication network 103 including a data network 104, telephony network 105, and wireless networks 107. It is contemplated that the data network 104 may be any local area network (LAN), metropolitan area network (MAN), wide area network (WAN), the Internet, or any other suitable network, such as a commercially owned, proprietary packet-switched network, e.g., a proprietary cable or fiber-optic network. The telephony network 105 may include a public switched telephone network (PSTN) or equivalent. It is also contemplated that the wireless network 107 may be, for example, a cellular network and may employ various technologies including, for example, code division multiple access (CDMA), enhanced data rates for global evolution (EDGE), general packet radio service (GPRS), global system for mobile communications (GSM), universal mobile telecommunications system (UMTS), etc., as well as any other suitable wireless medium, e.g., microwave access (WiMAX), Long Term Evolution (LTE) networks, wireless fidelity (WiFi), satellite, and the like. Communication network 103 may include session control capabilities such as those provided by the Internet protocol multimedia subsystem (IMS). The communication network 103 supports a variety of communications sessions (e.g., voice, video, text messaging, electronic mail (e-mail), instant messaging, etc.) conducted on any device capable of communicating over the network 103.

In one embodiment, the call center service is a managed service, whereby a service provider operates the call center manager 109 to serve one or more customers (i.e., subscribers) 117. A call center supervisor can access the web-based system via any wired or wireless terminals 113 to initiate one or more service observing (SO) sessions. In another embodiment, once the supervisor logs in, the system automatically initiates at least one service observing session based on a predetermined business rule. The predetermined business rule may include a call duration, call on-hold times per call, answer/seizure ratio (ASR), customer satisfactory level, etc., in order to improve the customer support service efficiency, effectiveness, and cost. In addition, the call center manager 109 restricts the number of concurrent service observing sessions based on a predetermined restriction criterion, such as the number of licenses obtained to operate call logging applications, call monitoring applications, etc.

In some embodiments, the communication device 113 is any fixed terminal, mobile terminal, or portable terminal capable of communication over the communication network 103. Examples of the communication device include a mobile smart phone, a mobile feature phone, a phone connected to a Public Switched Telephone Network (PSTN), a personal digital assistant (PDA), a personal computer (PC), as well as other like technologies and customer premises equipment (CPE). Within the system 100, call center 101, via a call center manager 109, provides the capability to dynamically initiate a service observing session over a communication network 103 available to a customer 117. By way of example, call center 101 can be a physical facility that houses call center human agents. A call center is often linked to a corporate computer network, including mainframes, microcomputers and LANs. To communicate with customers, the agents employ computing devices (e.g., a desktop computer, etc.), and telephone stations; such equipment along with the physical space occupied by the agent can constitute a "workstation." The call center 101, in one embodiment, can provide one or more supervisor stations, which permit monitoring of the agents' communications with the customers. In one embodiment, call enter 101 can be independently operated or networked with other call centers.

A customer 117 can utilize a number of different types of devices to connect to the network 103 and requires the services of the call center manager 109. In addition, multiple agents 111b, 111c can be monitored by supervising agents 111a, 111n, via one or more service observing sessions 115. In an exemplary embodiment, the call center manager 109 is resident within the call center 101. In addition (or alternatively), the call center manager 109 resides within customer premises equipment (CPE).

In operation, the call center manager 109 receives a request for service from a customer 117, and determines one or more service requirements based on the request. The manager 109 can then select agents 111 to service the request based on the service requirements of customer 117, and selectively initiate one or more service observing sessions 115 for some supervising agents 111a, 111n, etc. for monitoring the agents 111b, 111c, etc. By way of example, a supervisor 111a at times monitors agents 111b, 111c to assist in responding to customer needs.

With call center services, the manner in which calls are routed can be based on one or more characteristics of the agent. For instance, these characteristics/attributes can include: skill set, presence status, location, calendar information of the agent, communication capability of the agent, capabilities of the device or terminal of the agent, and mobility of the agent. These characteristics/attributes are more fully described with respect to FIG. 8.

Under the scenario of FIG. 1, a customer experiences a technical problem with a particular service. Accordingly, a technical support call 121 is initiated by a customer 117a via a mobile device 119a to the call center 101. The call is received by ACD 110 and routed to an agent 111b, who has technical knowledge and experience with field repairs. This agent 111a may be a supervisor or a team leader of the agent 111b. While the agent 111b answering the call with his laptop 113a and guiding the customer 117a to perform a simple repair, the call center manager 109 establishes a service observing session 115a for a supervising agent 111a to monitor the call. In this example, the monitoring is triggered by the fact that the call duration has last over a typical duration, e.g., 15 minutes. In one embodiment, this can be affected based on a predetermined business rule.

According to another scenario, the agent 111b encounters a problem, thus conferences in the supervising agent 111a, constituting a service observing session. That is, the agent 111b can initiate the service observing session, rather than the supervising agent 111a.

In certain embodiments, call center 101 employs an automatic call distributor (ACD) 110 to process calls among the agents 111. Specifically, the ACD 110 distributes incoming calls from telephony network 105 to a specific group of terminals that agents use, and can be part of a computer telephony integration system that utilizes data network 104 to process voice calls. By way of example, ACD 110 routes these calls using a rule-based scheme—e.g., the algorithm can determine the best available agent(s) to respond to a given incoming call based on one or more criteria. In one embodiment, to make this determination, ACD 110 can solicit and evaluate additional data (e.g., caller ID, interactive voice response (IVR), etc.) to determine the reason(s) for the incoming call. Such data can be collected from the customers 117.

Once routed, the calls can be monitored. With respect to monitoring of agents, a supervisor traditionally has two basic mechanisms: (1) using dedicated devices that are physically located in the call centers and always connected to the associated systems, or (2) to access such systems via placement of a toll free number into the public switched telephone network (PSTN). Under this approach, when logging in via an IVR/phone interface, the call center supervisors have limited ability to select agents dynamically.

Typically, in an ACD based system, every monitored call session requires a software license. That is, control of the number of concurrent service observing sessions executed based on a third-party's resource (such as an ACD) is restricted by legal instruments, such as licenses, leases, service agreements, etc. The number of licenses required on the third-party software depends on the entire population of supervisors in one or more call centers exceeds a contracted restriction. This can be problematic if the population is of any significant size.

To address the described issue relating to concurrent service observing sessions, the call center manager 109 dynamically initiates these sessions based on a set of business rules. Such approach, in certain embodiments, leverages available third-party resources, supervisors, agents, and equipment capabilities to reduce the cost and time necessary for establishing the service observing sessions while enhancing quality of service to the customer.

As seen in FIG. 1, the call center manager 109 has connectivity to multiple agents 111a-111n and one or more customers 117 via communication devices 113a-113n, respectively, via the network 103. In some embodiments, one or more service observing sessions 115 are established among the agents 111 according to various parameters, e.g., business rules, third-party resources restrictions, the presence information of the agents 111, etc. In one embodiment, the business rules include call duration, call on-hold duration per call, call on-hold times per call, answer/seizure ratios (ASR), max numbers of retries, call priority, call feedback, call service operational cost, call service performance, network capacity, network quality of service (QoS), 100% Do-Not-Call list compliance, or a combination thereof. These rules are more fully described with respect to FIG. 6.

In one embodiment, the third-party resources restrictions can include contractual restrictions involving the third party's hardware (e.g., equipment, storage capabilities, computing capabilities, network bandwidth, etc.), software (e.g., a number of concurrently operating licenses of third-party ACD software, etc.), as well as other resources impacting service observing sessions (e.g., staff, office/warehouse space, etc.). These parameters are more fully described with respect to FIG. 7. By way of example, to achieve software license compliance through efficient software license management, call center manager 109 determines installed software products (e.g., ACD applications), maps installed software products to existing software licenses, and reports compliance status. This thus limits the likelihood of license breach and maximizes license utilization, thereby reducing cost.

Also, although various exemplary embodiments are described with respect to a third party software license as a service observing session restriction, it is contemplated that the number of current service observing sessions may be restricted by other third-party resource restrictions.

Figure 2:
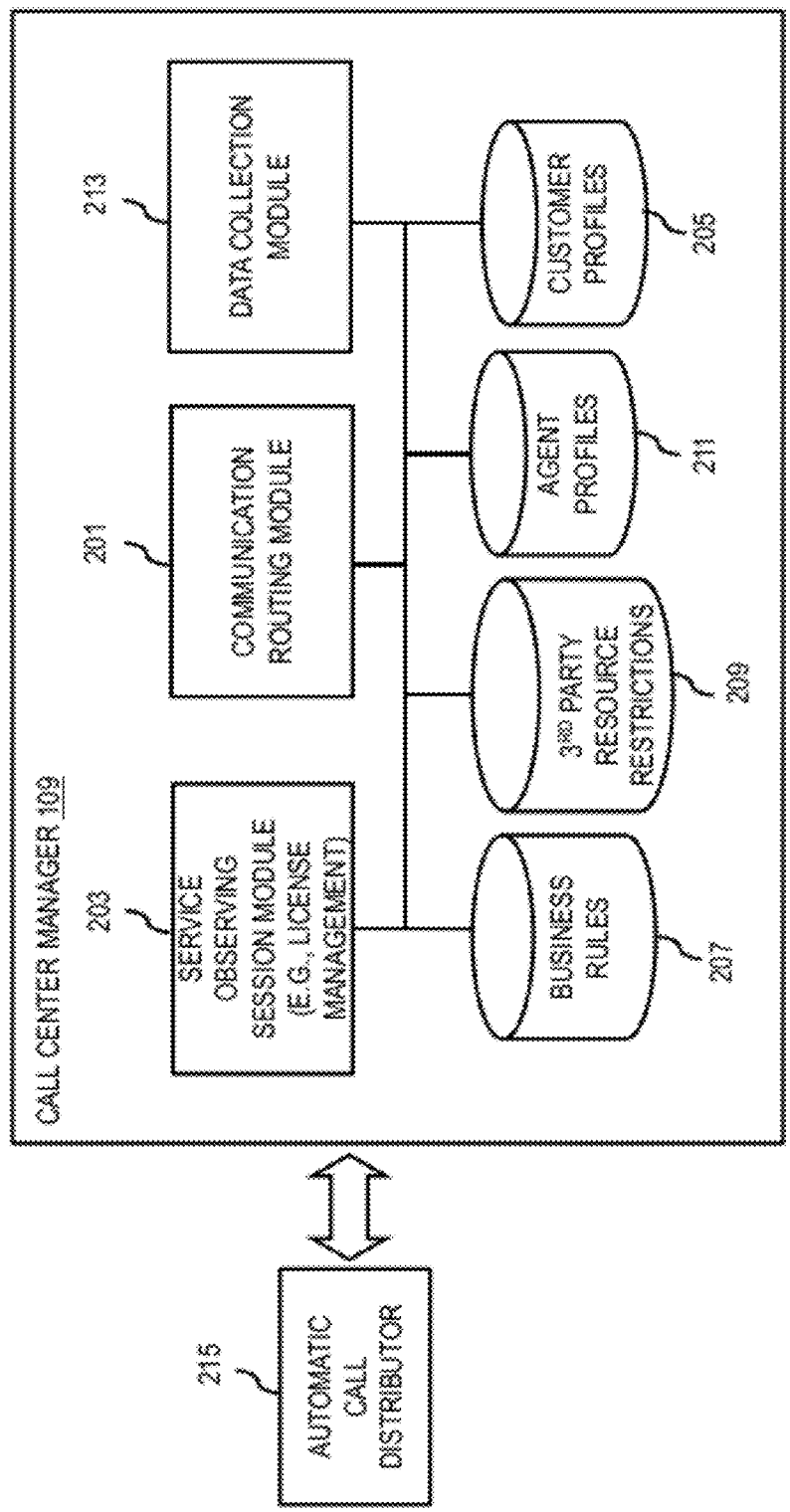
FIG. 2 is a diagram of the components of a call center manager that utilizes a business rule database to manage concurrent service observing sessions, according to an exemplary embodiment.

FIG. 2 is a diagram of the components of a call center manager that utilizes a business rule database to manage concurrent service observing sessions, according to an exemplary embodiment. By way of example, the call center manager 109 includes one or more modules for initiating a service observing session. In one embodiment, the call center manager 109 includes a communication routing module 201 to receive and process communications from customers 117. According to certain embodiments, the module 201, for example, is configured to operate in at least two modes. In a first mode, the module 201 is configured to respond to an initial request from a customer 117 for service. The request from the customer 117 may include specific requirements for various attributes of an agent 111 (e.g., skill set, location, mobility, etc.). These attributes, for instance, are defined in the agent information associated with an agent 111. On receiving the request, the module 201 processes the request to determine specific service requirements. The module 201 then selects an agent 111 from a group of agents 111 available to the call center manager 109 by evaluating the agent information associated with each agent 111 against the determined service requirements.

In a second mode, the module 201 is configured to process communications from/to the agent 111 on behalf of a communication service provider.

As shown, the module 201 has connectivity to a customer profile database 205 and an agent profile database 211 to assist in making the selection of the appropriate agent. In exemplary embodiments, the customer profile database 205 stores information such as the history of service requests from the customer 117 and the agents 111 selected to service those prior requests. In certain embodiments, the module 201 uses the historical information in the customer profile database 205 to assist in the selection of the agents 111. In addition, the module 201 can store a record of a new selection of an agent 111 in the database 205, wherever the incoming call is forwarded to a different agent. In addition or alternatively, the historical information can be stored as part of the agent information associated with agent 111 in the agent profile database 211.

To monitor a call between an agent 111 and a customer 117, the call center manager 109 also provides a service observing session module 203 that accesses a business rule database 207, a third-party resource restriction database 209, and the agent profile database 211 to determine which agent(s) to initiate service observing sessions with. The detailed operation of the service observing session module 203 is further described with respect to FIGS. 3-5. The exemplary data structures of the databases 207, 209 and 211 are described with respect to FIGS. 6-8.

The service observing session module 203 allows a supervisor to observe calls in progress on an on-demand basis, for instance. In one embodiment, the module 203 allows a supervisor to observe consecutive calls without reactivating a service observing session. The supervisor may activate a service observing session for an agent's call, even when the agent is not active on a call. By way of example, the supervisor enters a "wait" mode until the agent receives a call. When the agent receives the call, the supervisor is bridged onto the call.

In one embodiment, the module 201 interacts with the service observing session module 203 to select the appropriate agent 111, and optionally a service observing session 115 to handle the customer communication. By way of example, the call routing module 201 can apply an expert agent distribution (EAD) algorithm to route a call to the agent who is best qualified to handle the call, a most idle agent (MIA) algorithm to route a call to a least occupied agent while maintaining a minimum required skill level, etc.

According to certain embodiments, the components of the call center manager 109 (e.g., communication routing module 201, the service observing session module 203, etc.) implement business rules, third-party recourse restrictions, user information, and agent information using, for instance, standard presence protocols (e.g., Session Initiation Protocol for Instant Messaging and Presence Leveraging Extensions (SIMPLE) and Extensible Messaging and Presence Protocol (XMPP)). SIMPLE and XMPP are examples of presence protocols that provide real-time or near real-time presence information. Specifically, SIMPLE uses the Session Initiation Protocol (SIP) to register, manage, transmit, and receive presence information. XMPP provides similar capabilities using an open standard. Both protocols are extensible standards, which enables the incorporation of the agent information described herein through the additional information elements within the standard protocols.

The agent profile database 211 stores a listing of the identifiers of agents 111 and associated information such as characteristics of the agents. In certain embodiments, each agent 111 may update his or her own agent information via the module 201 through either a manual or automated process (e.g., automatically changing status from "on phone" to "available" after completing a phone call, or changing location using location information from a location-aware mobile handset). It is also contemplated that the agent information may be updated by one or more other designated parties.

In one exemplary embodiment, the service observing session module 203 may operate in conjunction with a data collection module 213 (which may be implemented, for example, as a separate server) to collect, store, and distribute the agent information. By way of example, the agent information can originate from any number of sources (e.g., direct input from each agent 111; input from a designated administrator; telemetry data from equipment associated with each agent such as location information from a location-aware mobile handset; information from other servers, etc.). The module 213 updates the agent information periodically to provide the modules 201, 203 with the most current data.

In one exemplary embodiment, the call center manager 109 interacts with an external automatic call distributor (ACD) 215 to implement the functions of the communication routing module 201 and the service observing session module 203. In this embodiment, the ACD 215 receives a call from the customer 117, and then receives commands from the call center manager 109 to route calls and initiate service observing sessions. The ACD 215 can be a part of the call center 101, or alternatively, may be a third-party-operated system—that is, not under the control of the provider of the call center 101.

In one embodiment, the functions of the ACD 215 are internal to the call center manager 109, and can be a standalone equipment or be integrated with other network component.

Figure 3A:
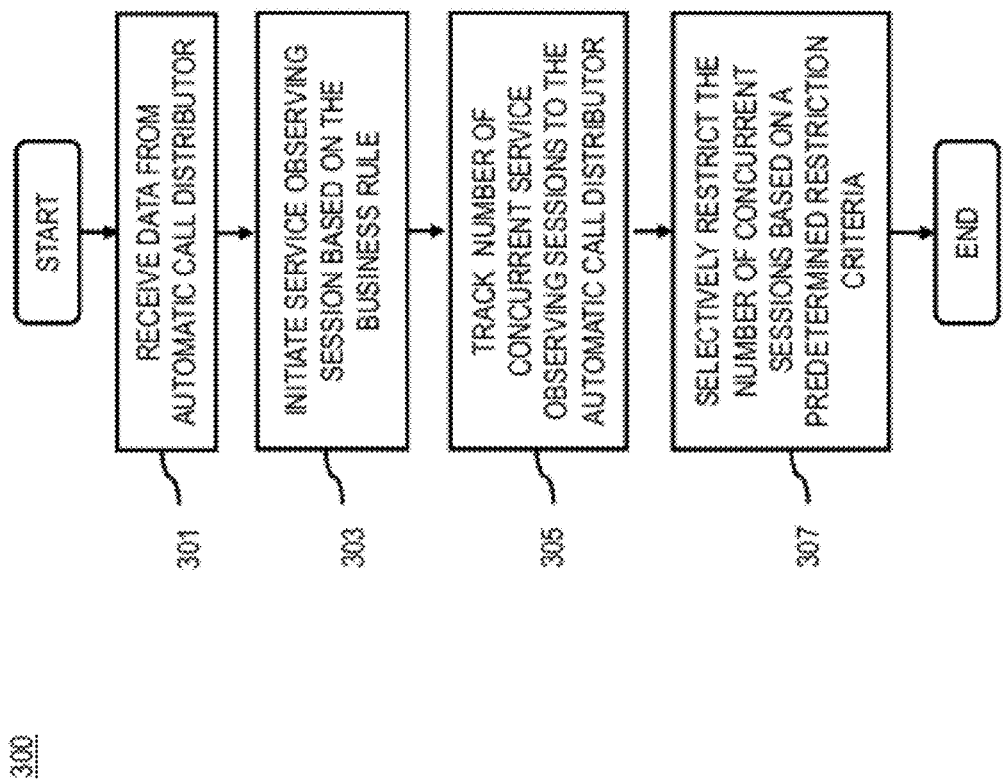
FIGS. 3A and 3B are, respectively, a flowchart of a process for initiating a service observing session, and a process for formulating restriction criteria, according various embodiments.

FIG. 3A is a flowchart of a process 300 for initiating a service observing session, according to an exemplary embodiment. In step 301, the call center manager 109 receives data relating to communication sessions involving the automatic call distributor (ACD) 215 for applying at least one predetermined business rule. For example, the data includes call detailed records (CDRs), internet protocol detail records (IPDRs), etc. Such data may be retrieved internally or received through at least one web feed. In various embodiments, the predetermined business rule specifies criteria relating to a call duration, call on-hold duration per call, call on-hold times per call, answer/seizure ratios (ASR), call feedback, call service operational cost, call service performance, network capacity, network quality of service (QoS), etc. The business rule may be any of the business rules later discussed in FIG. 6.

A call detail record (CDR) is produced by a telephone exchange (usually including an ACD) containing details of a phone call that passed through it. A CDR may include data fields of a number of a calling party, a number of a called party, a starting time of a call, a call duration, a phone number charged for the call, an identifier of the telephone exchange writing the record, a sequence number identifying the record, additional digits on the called number used to route or charge the call, a result of the call (whether it was answered, busy, etc.), a route by which the call entered the exchange, a route by which the call left the exchange, a call type (e.g., voice, SMS, etc.), a fault condition encountered, etc.

An internet protocol detail record (IPDR) provides information of IP-based service usage and other activities that can be used by call centers, operational support systems (OSS), business support systems (BSS), etc. The content of the IPDR may be determined by the communication service provider, third party network/service vendors, the IPDR industry association, etc. For specifying the particulars of IP-based services in a given context, an IPDR usually contains identification information of the users of the service, types of services used, quantity measurement unit types (e.g., Kilobytes or time), quantities of services used, QoS parameters, the date/time the services were used, etc. In one embodiment, an IPDR contains information similar to a CDR with respect to a sequence of emails, a chat session, visiting websites, instant messaging, etc.

The call center manager 109 initiates one or more service observing sessions based on the business rule (step 303). The service observing session may be initiated automatically or in response to a user request as later discussed with respect to the processes of FIGS. 4-5. In some embodiments, the service observing session is initiated via the automatic call distributor 215. For example, after receiving a predetermined number of customer complaints about a particular agent, the call center manager 109 transmits a command to the automatic call distributor 215 for initiating at least one of the service observing session on the agent. A service observing sessions is then established with a user (e.g., a supervisor, team leader, manager, etc. working for or on behalf of the combination service provider) to monitor a voice call with the corresponding agent. In one embodiment, the observing session is initiated via a web-based application. The web-based application allows the user to access the call center 101 from various devices.

Moreover, the service observing session can be initiated based on additional information, such as a skill set of the agent, presence status of the agent, location of the agent, calendar information of the agent, communication capability of the agent, etc. In a typical scenario, multiple service observing sessions are established through the ACD 215; however, as noted, this support for concurrent sessions can be costly and/or prohibited by licensing requirements.

Accordingly, the call center manager 109 tracks the number of concurrent service observing sessions to the automatic call distributor 215 (step 305), in order to comply with a restriction of the number of concurrent sessions. The call center manager 109 selectively restricts the number of concurrent sessions based on a predetermined restriction criterion (step 307). In one embodiment, the restriction of the number of concurrent sessions is subject to the third party resource restrictions as later described in conjunction with FIG. 7. It is contemplated that the predetermined restriction criterion can be applied as part of the business rules. By way of example, the number of concurrent sessions is restricted for one communication service provider across one or more call centers. In another embodiment, the number of concurrent sessions is restricted for one communication service provider across one or more call logging applications, one or more call monitoring applications, or a combination thereof.

Call logging includes collecting call data, analyzing the data, and reporting on the network's cost, performance, capacity, quality of service, etc. A call logging application interprets the raw CDR and/or IPDR data to produce graphical reports.

Figure 8:
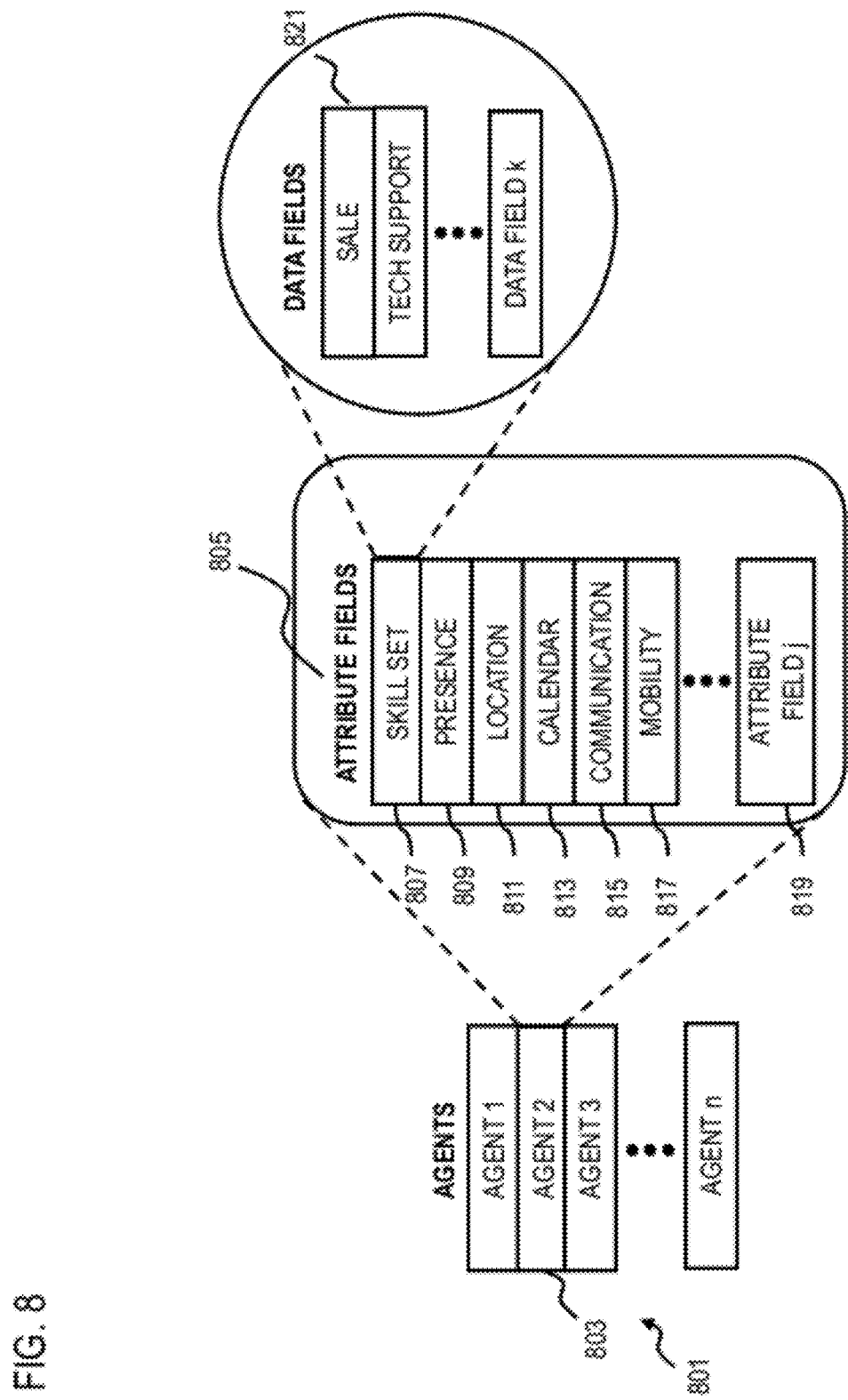
FIG. 8 is a diagram of a data structure associated with the agent profile database of FIG. 2, according to an exemplary embodiment.

The call center manager 109 may display to the user one or more options associated with the corresponding service observing session. By way of example, the options includes interacting by the user with an agent, a customer, or a combination thereof, monitoring the corresponding service observing session, etc. As mentioned, service observing is used to train agents and observe in-progress calls. The observer (e.g., skilled supervisor) toggles between a listen-only mode, listen/talk mode, etc. during calls in progress. The agent selection process can be based on certain attributes or characteristics, as illustrated in FIG. 8.

Figure 3B:
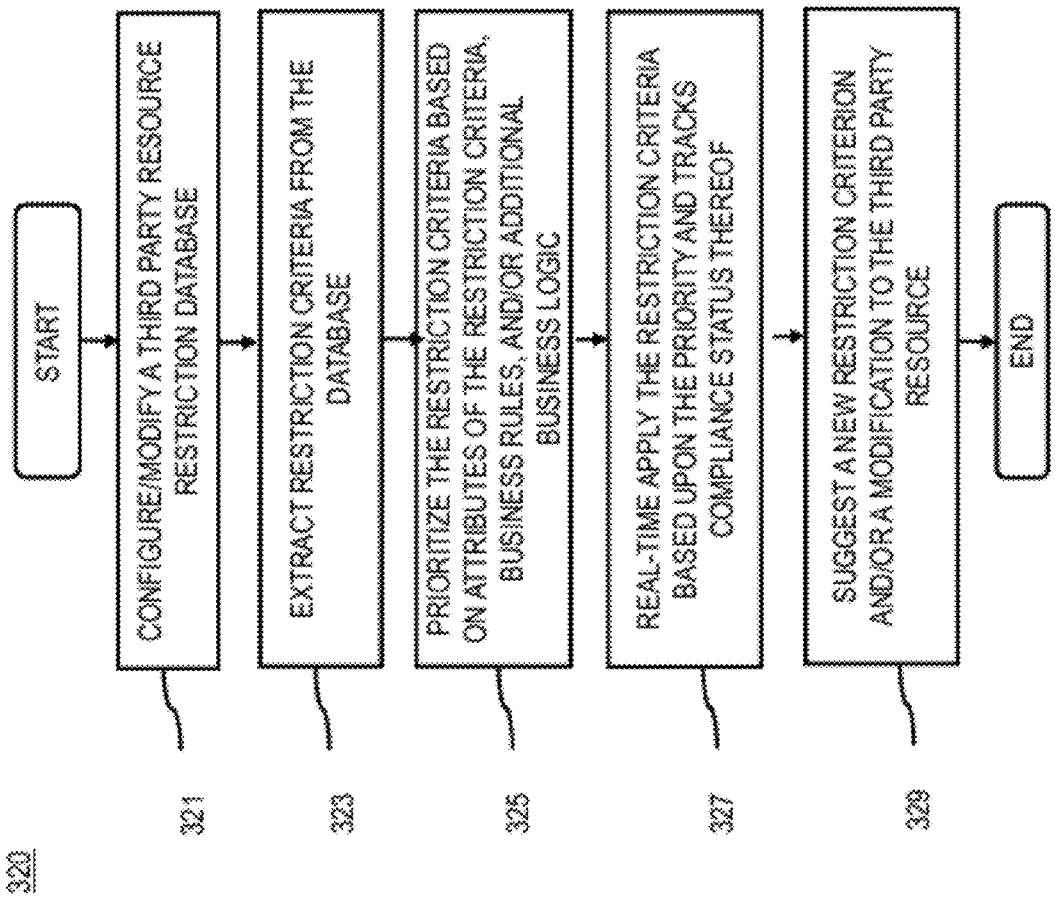
Figure 7:
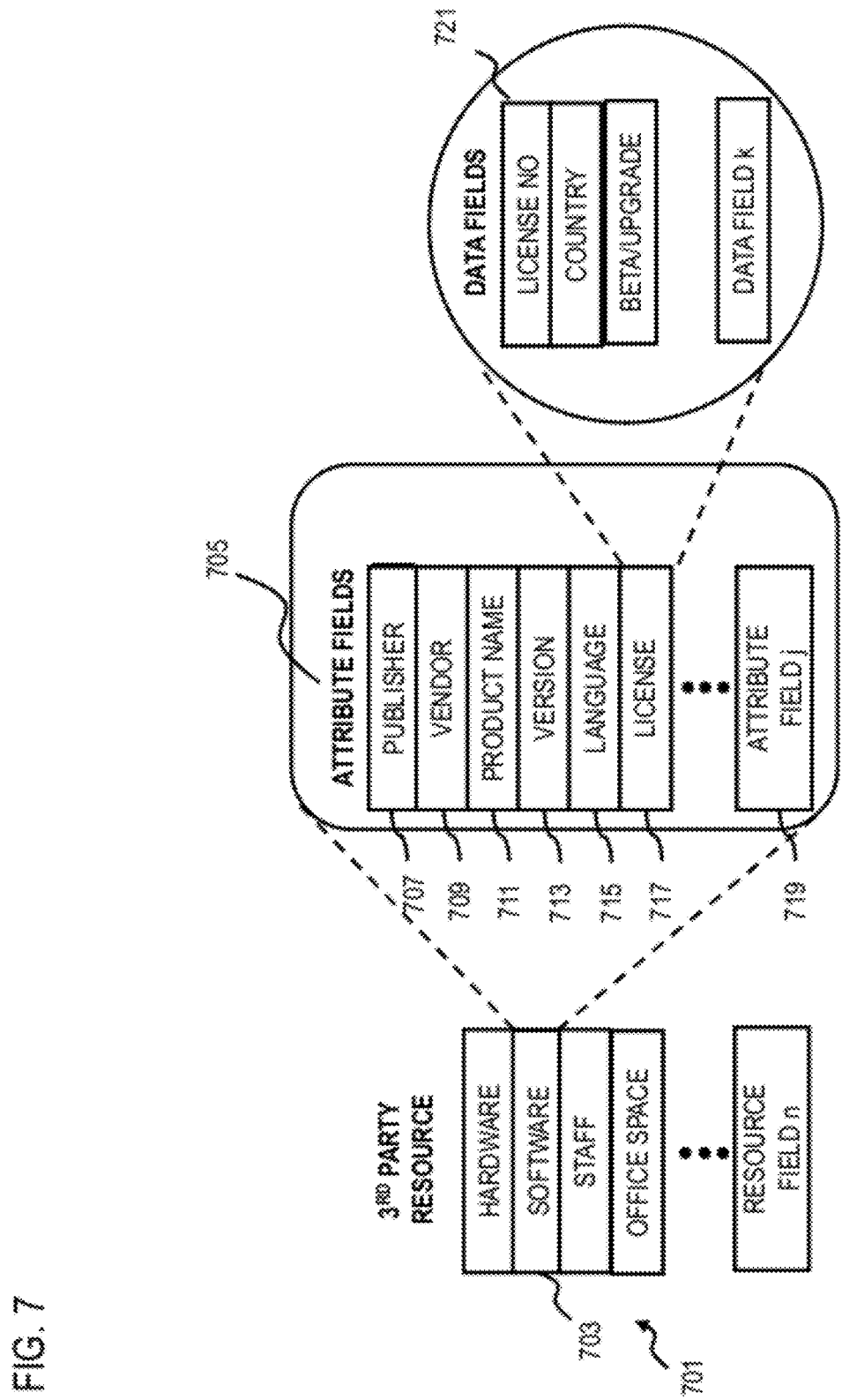
FIG. 7 is a diagram of a data structure associated with the database of agents of FIG. 2, according to an exemplary embodiment.

FIG. 3B is a flowchart of a process 320 for formulating restriction criteria and dynamically terminating service observing sessions to comply with the restriction criteria (e.g., software licenses), according to an exemplary embodiment. Process 320 involves the call center manager 109, per step 321, configuring and/or modifying the third party resource restriction database 209. For example, a communication service provider can deploy numerous third party owned, operated, and/or controlled resources to deliver communication services to its customers, and these resources are provided under different kinds of legal instruments with different restrictions. In one embodiment, the database 209 is configured/created with the information of all available third party resources, for example, as depicted in FIG. 7. In another embodiment, the database 209 is modified whenever a third party resource is added, modified, and/or removed. The call center manager 109 can manage a multitude of third party resource restrictions. In one embodiment, software licenses are enforced through these restrictions and may include node-locked (e.g., per-device, per-call center) licenses, concurrent-use, leased, custom licenses, etc.

In step 323, the call center manager 109 extracts restriction criteria (e.g., a number and durations of concurrent licenses of service observing sessions, etc.) from the database 209. The extraction may be conducted periodically or triggered by database modifications. In step 325, the call center manager 109 can prioritize the restriction criteria (step 325), based at least in part on the attributes of the restriction criteria (e.g., software license models), the business rules, additional business logic (e.g., sale calls are more important than customer complaint calls), or a combination thereof. In one embodiment, the priority is embedded with knowledge of software license models and compliance requirements. The software license models may be defined by a time duration, by times of usage, by a number of concurrent licenses, etc. The compliance requirements may be defined by an expiration period, a total usage of service observing sessions per month, a maximum number of concurrent service observing sessions at any given time, etc. By way of example, the call center manager 109 prioritizes observing sessions of sale calls over observing sessions of customer complaint calls by allotting a longer observing session duration, more observing sessions within the total usage limitation, and/or more concurrent observing sessions at a given time.

The call center manager 109 can apply, in real-time, the restriction criteria based upon the priority, and can track associated compliance status thereof (step 327). Under the previous example, the call center manager 109 terminates the observing sessions of customer complaint calls before terminating the observing sessions of sale calls, when reaching the limitation on the permitted concurrent sessions. By way of example, when determining a unused and/or underutilized third party resource (e.g., license), the call center manager 109 can suggest a new/modified restriction criterion to the third party resource (step 329) to reduce license cost. The call center manager 109 thus integrates license usage with compliance by maximizing licenses use while prohibiting license breach.

In another embodiment, the call center manager 109 sets a default time duration (e.g., three minutes) to each observing session. The call center manager 109 prioritizes extension requests for sale call observing sessions over extension requests for customer complaint call observing sessions, and maintains (initiate and/or terminate) the maximum number of concurrent service observing sessions at any time point based upon the priority. The call center manager 109 thus fully utilizes the licenses and reduces software licensing cost per session.

Figure 4:
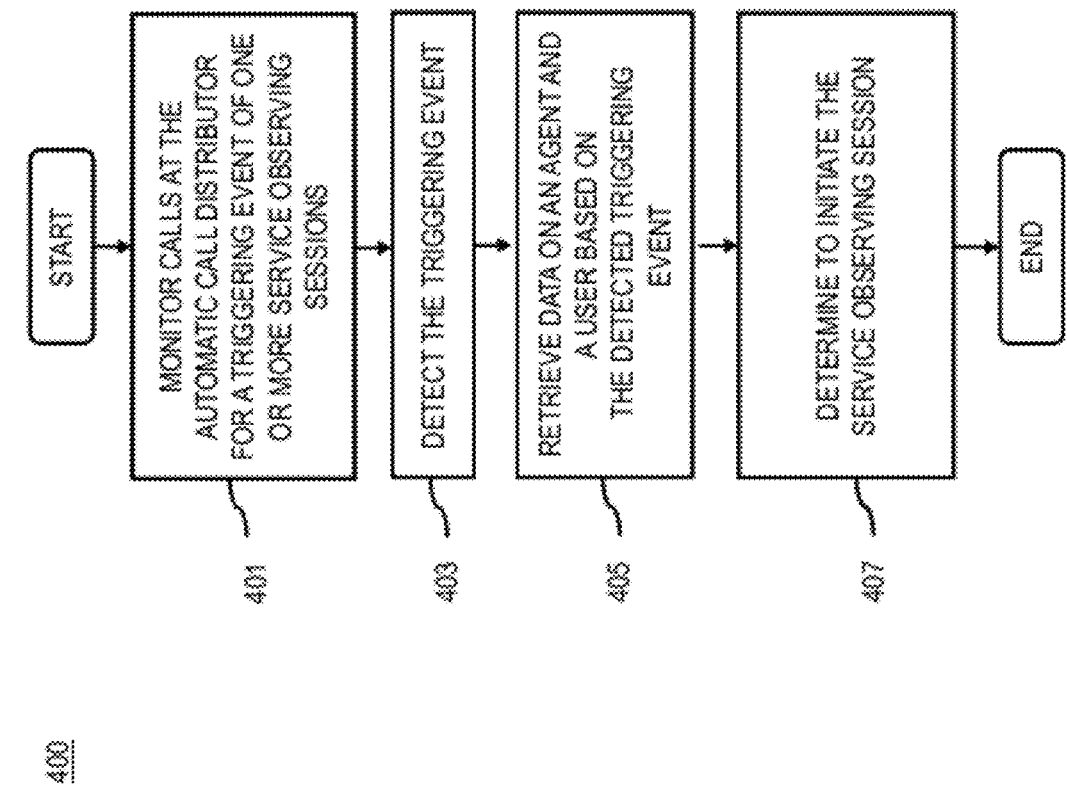
FIG. 4 is a flowchart of a process for initiating and/or terminating one or more service observing sessions, according to an exemplary embodiment.

FIG. 4 is a flowchart of a process 400 for determining whether to automatically initiate and/or terminate one or more service observing sessions, according to an exemplary embodiment. In this embodiment, at least one service observing session is automatically initiated and/or terminated without user intervention. In other words, the call center manager 109 may automatically select one or more service observing sessions 115 of agents 111 to be initiated and/or terminated for supervisors. In step 401, the call center manager 109 monitors calls at the automatic call distributor 215 for a triggering event of one or more service observing sessions. The triggering event is defined based at least in part on business rules, third-party resource restrictions, or a combination thereof as later discussed in conjunction with FIGS. 6 and 7. It is contemplated that call center manager 109 may use the agent/supervisor/customer attributes later discussed in conjunction with FIG. 8 to define a triggering event. In other embodiments, that call center manager 109 may use business rules, third-party resource restrictions, the agent/supervisor/customer information, or a combination thereof to define a triggering event.

The call center manager 109 detects the triggering event (step 403). The call center manager 109 retrieves data (e.g., attributes) on at least one agent and at least one supervisor based on the detected triggering event (step 405). From the information of the triggering event, the call center manager 109 determines a set of service observing requirements (e.g., agent-specific skills and performance records, customer-specific request history, etc.). The call center manager 109 then retrieves the agent/supervisor profile information and the customer profile information associated with the service observing sessions 115 and agents 111 that may potentially staff the service observing sessions. The call center manager 109 determines to initiate the one or more service observing sessions on the at least one agent by the at least one supervisor (step 407). Before, during or after the initiation of the new service observing sessions, the call center manager 109 may determines and/or execute termination of one or more existing service observing sessions based upon the restricting step 307 in FIG. 3A.

By way of example, the triggering event is one specific business rule regarding customer complaints. Such a customer calls to challenge violations of a not-to-call list. Upon receiving such a complaint, the call center manager 109 lunches service observing sessions 115 on agents who committed violations before as well as on agents who served the complaining customer.

Figure 5:
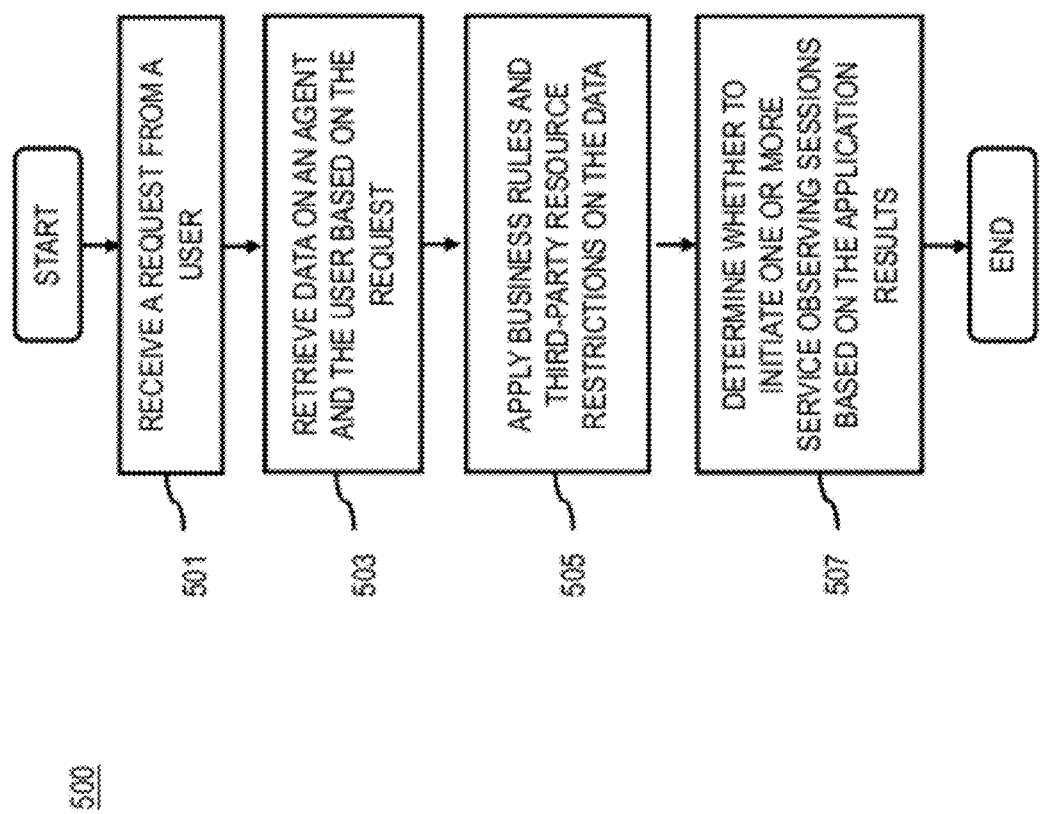
FIG. 5 is a flowchart of a process for handling a request for initiating and/or terminating one or more service observing sessions, according to an exemplary embodiment.

FIG. 5 is a flowchart of a process 500 for determining whether to response to a request for initiating and/or terminating one or more service observing sessions, according to an exemplary embodiment. In this embodiment, at least one service observing session is initiated by a user. In other words, the call center manager 109 selects the service observing sessions 115 and/or agents 111 at the time a communication from the user is received by the call center manager 109. In step 501, the call center manager 109 receives a request from the user (e.g., a supervisor, team leader, manager of the communication service provider or a third party call center, etc.). After receiving a request for initiating a service observing session from the user, the call center manager 109 authenticates the user.

After the user authentication, the call center manager 109 retrieves data on an agent and the user based on the request (step 503). From the information in the request, the call center manager 109 determines a set of service observing requirements (e.g., agent-specific skills and performance records, customer-specific request history, etc.). The call center manager 109 then retrieves the agent/supervisor profile information and the customer profile information associated with the service observing sessions 115 and agents 111 that may potentially staff the request. After retrieving the agent/supervisor/customer information associated with potential service observing sessions 115, the call center manager 109 evaluates the retrieved agent information against the determined service observing requirements of the supervisor to select which service observing sessions 115 and agents 111 can service the request.

The call center manager 109 applies certain business rules and third-party resource restrictions on the data (step 505). After retrieving the business rules, the third-party resource restrictions, the selected agent information associated with the potential service observing sessions 115, the call center manager 109 evaluates the selected agent information against the business rules and third-party resource restrictions to select which service observing sessions 115 to initiate. The call center manager 109 then determines whether to initiate one or more service observing sessions based on the application results (step 507). Before, during or after the initiation of the new service observing sessions, the call center manager 109 may determines and/or execute termination of one or more existing service observing sessions based upon, for example, the restriction provided by process 300 of FIG. 3A.

By way of example, to service a request from an online supervisor to monitor agents under his/her supervision who have not closed any sale in the past three days, the call center manager 109 selects agents 111 whose agent information satisfying the conditions specified in the request and assigns them to service observing sessions 115 designated to service the online supervisor.

Another example of initiating a service observing session 115 is provided as follows based upon a third party resource restriction, such as a predetermined license restriction on currently use of an ACD application. In a first scenario, the call center manager 109 initiates service observing sessions for all user requests if determining the implementation of all the sessions will not exceed the predetermined license restriction. In a second scenario, the call center manager 109 initiates service observing sessions for some of the user requests if determining full implementation will exceed the predetermined license restriction. By way of example, the to be fulfilled user requests may be selected based on rules such as network/exchange/server capabilities, caller/callee preferences, service contract terms and conditions etc. In a third scenario, the call center manager 109 does not initiate any service observing sessions if determining the predetermined license restriction has already been exceeded.

It is contemplated that call center manager 109 may select the service observing sessions 115 and/or agents 111 based upon the agent/supervisor/customer profiles, business rules and third-party resource restrictions in any combination and any order than the above-described embodiments. It is contemplated that call center manager 109 may use the processes 300-500 alone or in any combination.

Figure 6:
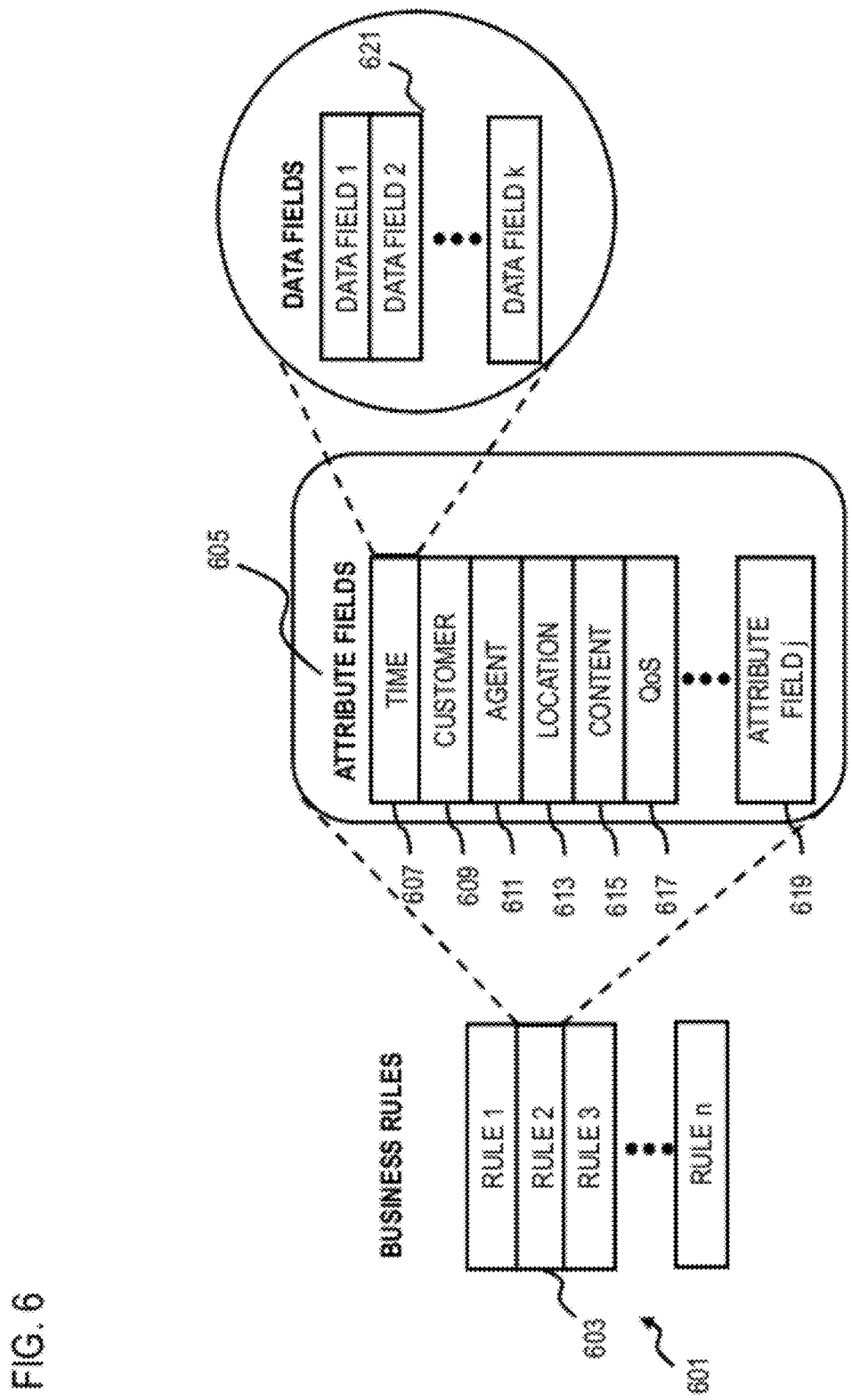
FIG. 6 is a diagram of a data structure that can be used by the business rule database of FIG. 2, according to an exemplary embodiment.

FIG. 6 is a diagram of a data structure that can be used by the business rule database 207 of FIG. 2, according to an exemplary embodiment. As in typical database management systems, data can be stored in one or more data containers, each container contains records, and the data within each record is organized into one or more fields. As shown in FIG. 6, a data container 601 of business rule records 603 is used to store, for instance, the business rule information and is correlated from 1 to n (n being an integer) to each business rule record 603. Business rules can apply to people, processes, corporate behavior and computing systems of the communication service provider, and are utilized to help the communication service provider to achieve its goals. For example, a business rule for initiating a service observing session may specify that no service observing session is to be performed on customers previously declined to be monitored. One example of how business rules can be applied includes initiating a service observing session if a customer service call lasts more than a predetermined threshold (e.g., 10 minutes in duration). Triggering events that initiate a service observing session include a call on-hold duration that lasts more than a specified time period (e.g., 5 minutes), a number of on-hold times during a call is more than a certain threshold (e.g., 6), an answer/seizure ratio (ASR) per agent per month below a certain level (e.g., less than 6), a number of calls for the same customer and the same issue is greater than a specified value (e.g., 5), an agent received more than a certain number of negative customer feedbacks in a month, an agent not making any sale in one week, an agent violates a Do-Not-Call list, etc. An Answer/Seizure ratio (ASR) is the number of successfully answered calls divided by the total number of calls attempted (seizures) multiplied by 100.

The business rule information (i.e., attribute fields 605) associated with each business rule record 603 can include the following fields: time 607, customer 609, agent 611, location 613, communication content 615, and quality of service 617. It is contemplated that additional attribute fields (e.g., attribute field j 619) may be provided depending on the particular application. Further, in some embodiments, each attribute field 605 comprises one or more data fields 621. In this regard, the number k of data fields 621 for each attribute field 605 is dependent upon the level of detail desired.

In an exemplary embodiment, the time field 607 can specify information such as one or more time points, one or more time periods, one or more numbers of times of a triggering event/activity of the business rule, etc. The customer field 609, can indicate the business rule's applicability to a particular customer as well as other information pertaining to the customer's preferences (e.g., privacy setting of the customer, etc.). The agent field 611 of the business rule can specify information relating to the skills, experience, performance, etc. of the agent. The location field 613 provides information pertaining to the applicable location of a business rule, e.g., a physical location of the agents, websites browsed by customers to reach call centers, etc. For example, the value of the location field 611 enables the call center manager 109 to select agents who are located near a particular geographic site to provide timely service.

Furthermore, the communication content field 615 provides information about the content, such as upcoming product promotions, technician chat room materials, etc. By leveraging communication content information 615, the call center manager 109 can assess an business rule's future availability in addition to the current availability of the business rule.

Additionally, the quality of service field 617 can specify the type of communication session (e.g., voice, video, instant messaging, chat, e-mail) in which the business rule can be applied. This capability, for instance, can be dictated by the type of communication device to assist the call center manager 109 in determining the types of communication sessions to be supported. It is contemplated that one or more of the characteristics in any combination can comprise the information to be a part the business rule.

FIG. 7 is a diagram of a data structure that can be used by the third-party resource restriction database 209 of FIG. 2, according to an exemplary embodiment. As shown, a data container 701 of resource records 703 is used to store, for instance, third-party resource restriction information and is correlated from 1 to n (n being an integer) to each resource record 703. The third-party resource restriction information (i.e., attribute fields 705) associated each resource record 703 can include the following fields: a publisher 707, vendor 709, product name 711, version 713, language 715, and license 717. It is contemplated that other attribute fields (e.g., attribute field j 719) may be employed. Further, each attribute field 705 may comprise one or more data fields 721.

In one embodiment, the publisher field 707 can include such information as the name, address, webpage, contact information, etc. of the software publisher. The vendor field 709 of the software resource provides information such as the vendor's name, address, webpage, contact information, etc. By way of example, the communication service provider can acquire a piece of software directly from the publisher, or via a vendor that provides maintenance as well. The product name 705 may include an official name, a nick name, etc. of the software. The version 713 of the software may specify whether it is a trial version, a beta version, as well as a version number, etc. The language field 715 of the software may be a spoken language, a computer language, etc. The license 717 of the software includes the number of licenses, the license country, whether the license is for a beta version, or the license is eligible for upgrade, etc. The exemplary attributes and corresponding data are pertained to software resources. It is also contemplated that different types of resources has different attributes and corresponding data. It is contemplated that exemplary embodiments may add, delete, or substitute any of the described characteristics. One or more of the characteristics in any combination comprise the third-party resource restriction information of the communication service provider.

FIG. 8 is a diagram of a data structure that can be used by the agent profile database 211 of FIG. 2, according to an exemplary embodiment. Data container 801 of agent records 803 is used to store, for instance, the agent information. One or more agent records 1 to n (n being an integer) can be stored. By way of example, the agent information (i.e., attribute fields 805) associated with each agent record 803 can include a skill set field 807, a presence field 809, a location field 811, a calendar field 813, a communication field 815, and a mobility field 817. Additional attribute fields (e.g., attribute field j 819) can be specified. As with the data structure of FIGS. 6 and 7, attribute field 805 can include one or more data fields 821.

In an exemplary embodiment, the skill set field 807 of an agent 111 includes information such as the technical capabilities of the agent 111, language skills of the agent 111, knowledge base, areas of expertise, and/or experience with specific users 117 or customers of the users 117. The presence status 809 of the agent 111 indicates information such as the agent's availability, along with other information, such as available to accept new requests, not available because the agent is with a customer, on break, or away from desk, etc.). The location 811 of the agent 111 indicates the agent's physical location. The calendar information 813 of the agent 111 provides information on upcoming appointments, scheduled absences, work schedule, etc. With the calendar information 813, the call center manager 109 can assess an agent's future availability in addition to the current availability. The communication capability 815 of the agent 111 indicates the type of communication session (e.g., voice, video, instant messaging, chat, e-mail) in which the agent 111 can engage. This capability, for instance, is dictated at least in part by the type of communication device 113 that the agent 111 is using. Finally, the mobility field 817 indicates whether the agent 111 can travel to a different location (e.g., to provide onsite support).

The described processes and arrangement advantageously enables the observer (e.g., skilled supervisor) to monitor calls in progress from any device at anywhere. The described processes and arrangement also implements business rules (e.g., a call duration, not-to-call list, etc.) and third-party resource restrictions (e.g., a limited number of software licenses), to enable communication service providers to comply with their contractual obligations, law, and regulations, while increasing customer satisfaction.

Figure 9:
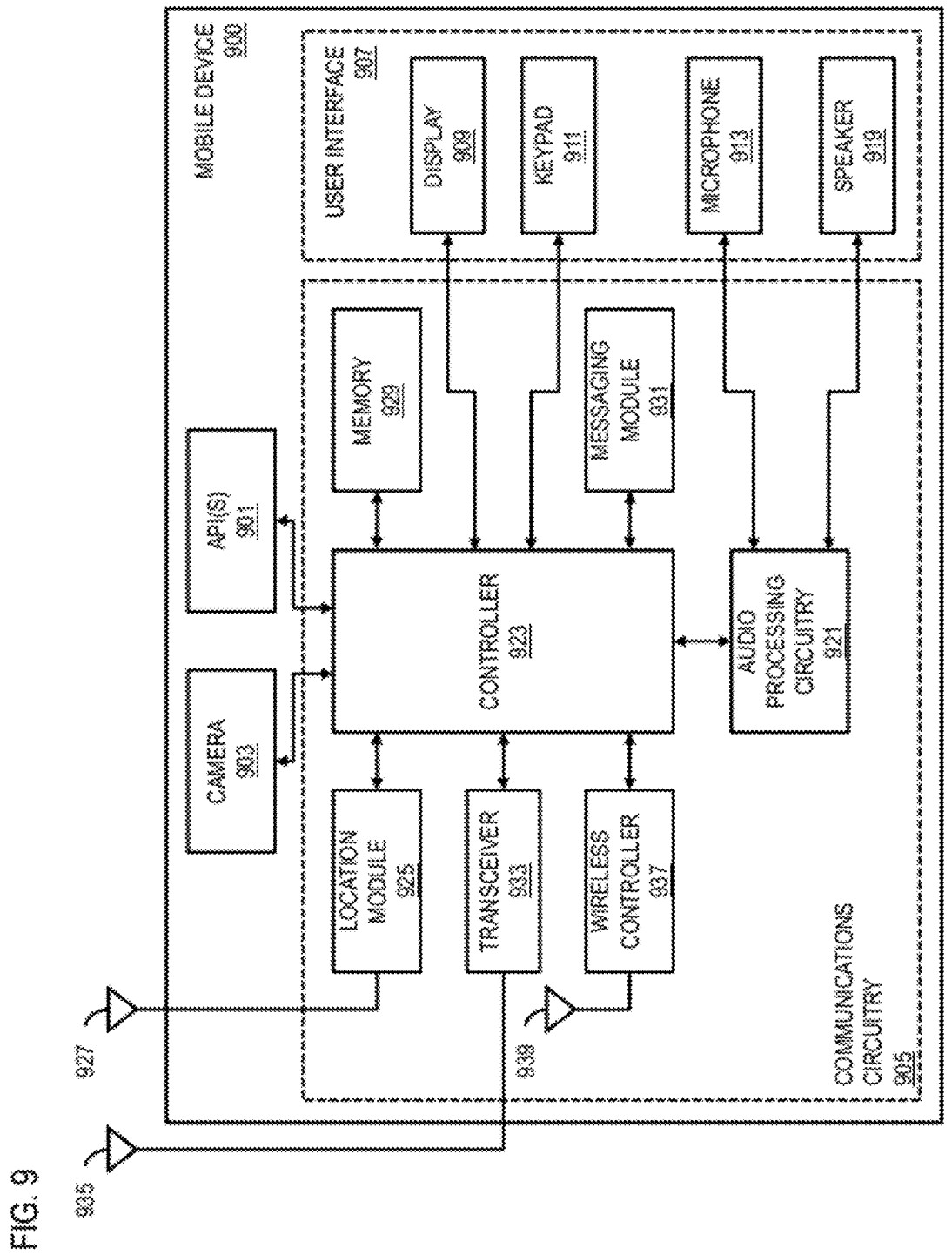
FIG. 9 is a diagram of a mobile device configured to remotely initiate a service observing session, according to an exemplary embodiment.

FIG. 9 is a diagram of a mobile device configured to initiate a service observing session, according to an exemplary embodiment. Mobile device 900 may comprise computing hardware (such as described with respect to FIG. 10), as well as include one or more components configured to execute the processes described herein for initiation a service observing session over a network from or through the mobile device 900. In this example, mobile device 900 includes application programming interface(s) 901, camera 903, communications circuitry 905, and user interface 907. While specific reference will be made hereto, it is contemplated that mobile device 900 may embody many forms and include multiple and/or alternative components.

According to exemplary embodiments, user interface 905 may include one or more displays 909, keypads 911, microphones 913, and/or speakers 915. Display 909 provides a graphical user interface (GUI) that permits a user of mobile device 900 to view dialed digits, call status, menu options, and other service information. The GUI may include icons and menus, as well as other text and symbols. Keypad 909 includes an alphanumeric keypad and may represent other input controls, such as one or more button controls, dials, joysticks, touch panels, etc. The user thus can construct customer profiles, enter commands, initialize applications, input remote addresses, select options from menu systems, and the like. Microphone 911 coverts spoken utterances of a user (or other auditory sounds, e.g., environmental sounds) into electronic audio signals, whereas speaker 913 converts audio signals into audible sounds.

Communications circuitry 905 may include audio processing circuitry 921, controller 923, location module 925 (such as a GPS receiver) coupled to antenna 927, memory 929, messaging module 931, transceiver 933 coupled to antenna 935, and wireless controller 937 coupled to antenna 939. Memory 929 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 929 may be implemented as one or more discrete devices, stacked devices, or integrated with controller 923. Memory 929 may store information, such as one or more customer profiles, one or more user defined policies, one or more contact lists, personal information, sensitive information, work related information, etc.

Additionally, it is contemplated that mobile device 900 may also include one or more applications and, thereby, may store (via memory 929) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, control signals received by mobile device 900 from, for example, network 107 may be utilized by API(s) 901 and/or controller 923 to facilitate remotely configuring, modifying, and/or utilizing one or more features, options, settings, etc., of these applications. It is also contemplated that these (or other) control signals may be utilized by controller 923 to facilitate remotely backing up and/or erasing data associated with these applications. In other instances, the control signals may cause mobile device 900 to become completely or partially deactivated or otherwise inoperable.

Accordingly, controller 923 controls the operation of mobile station 900, such as in response to commands received from API(s) 901 and/or data stored to memory 929. Control functions may be implemented in a single controller or via multiple controllers. Suitable controllers 923 may include, for example, both general purpose and special purpose controllers and digital signal processors. Controller 923 may interface with audio processing circuitry 921, which provides basic analog output signals to speaker 919 and receives analog audio inputs from microphone 913. In exemplary embodiments, controller 923 may be controlled by API(s) 901 in order to capture signals from camera 903 or microphone 913 in response to control signals received from network 107. In other instances, controller 923 may be controlled by API(s) 901 to cause location module 925 to determine spatial positioning information corresponding to a location of mobile device 900. Still further, controller 923 may be controlled by API(s) 901 to image (e.g., backup) and/or erase memory 929, to configure (or reconfigure) functions of mobile device 900, to track and generate device usage logs, or to terminate services available to mobile device 900. It is noted that captured signals, device usage logs, memory images, spatial positioning information, and the like, may be transmitted to network 107 via transceiver 933 and/or wireless controller 937. In this manner, the captured signals and/or other forms of information may be presented to users and stored to one or more networked storage locations, such as customer profiles repository (not shown), or any other suitable storage location or memory of (or accessible to) the components and facilities of system 103.

It is noted that real time spatial positioning information may be obtained or determined via location module 925 using, for instance, satellite positioning system technology, such as GPS technology. In this way, location module 925 can behave as (or substantially similar to) a GPS receiver. Thus, mobile device 900 employs location module 925 to communicate with constellation of satellites. These satellites transmit very low power interference and jamming resistant signals received by GPS receivers 925 via, for example, antennas 927. At any point on Earth, GPS receiver 925 can receive signals from multiple satellites, such as six to eleven. Specifically, GPS receiver 925 may determine three-dimensional geographic location (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites. Thus, if mobile device 900 is able to identify signals from at least four satellites, receivers 925 may decode the ephemeris and clock data, determine the pseudo range for each satellite 125 and, thereby, compute the spatial positioning of a receiving antenna 927. With GPS technology, mobile device 900 can determine its spatial position with great accuracy and convenience. It is contemplated, however, that location module 925 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

Mobile device 900 also includes messaging module 931 that is configured to receive, transmit, and/or process messages (e.g., EMS messages, SMS messages, MMS messages, IM messages, electronic mail messages, and/or any other suitable message) received from (or transmitted to) network 107 or any other suitable component or facility of system 100. As previously mentioned, network 107 may transmit control singles to mobile device 900 in the form of one or more API 901 directed messages, e.g., one or more BREW directed SMS messages. As such, messaging module 931 may be configured to identify such messages, as well as activate API(s) 901, in response thereto. Furthermore, messaging module 931 may be further configured to parse control signals from these messages and, thereby, port parsed control signals to corresponding components of mobile device 900, such as API(s) 901, controller 923, location module 925, memory 929, transceiver 933, wireless controller 937, etc., for implementation.

According to exemplary embodiments, API(s) 901 (once activated) is configured to effectuate the implementation of the control signals received from network. It is noted that the control signals are utilized by API(s) 901 to, for instance, remotely control, configure, monitor, track, and/or capture signals from (or related to) camera 903, communications circuitry 905, and/or user interface 907. In this manner, visual and/or acoustic indicia pertaining to an environment surrounding mobile device 900 may captured by API(s) 901 controlling camera 903 and microphone 913. Other control signals to cause mobile device 900 to determine spatial positioning information, to image and/or erase memory 929, to configure (or reconfigure) functions, to track and generate device usage logs, or to terminate services, may also be carried out via API(s) 901. As such, one or more signals captured from camera 903 or microphone 913, or device usage logs, memory images, spatial positioning information, etc., may be transmitted to network 107 via transceiver 933 and/or wireless controller 937, in response to corresponding control signals provided to transceiver 933 and/or wireless controller 937 by API(s) 901. Thus, captured signals and/or one or more other forms of information provided to network 107 may be presented to users and/or stored to one or more of customer profiles repository (not shown), or any other suitable storage location or memory of (or accessible to) the components and facilities of system 103.

It is also noted that mobile device 900 can be equipped with wireless controller 937 to communicate with a wireless headset (not shown) or other wireless network. The headset can employ any number of standard radio technologies to communicate with wireless controller 937; for example, the headset can be BLUETOOTH enabled. It is contemplated that other equivalent short range radio technology and protocols can be utilized. While mobile device 900 has been described in accordance with the depicted embodiment of FIG. 9, it is contemplated that mobile device 900 may embody many forms and include multiple and/or alternative components.

The described processes and arrangement advantageously enables initiation a service observing session over a network. The processes described herein for initiation a service observing session may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
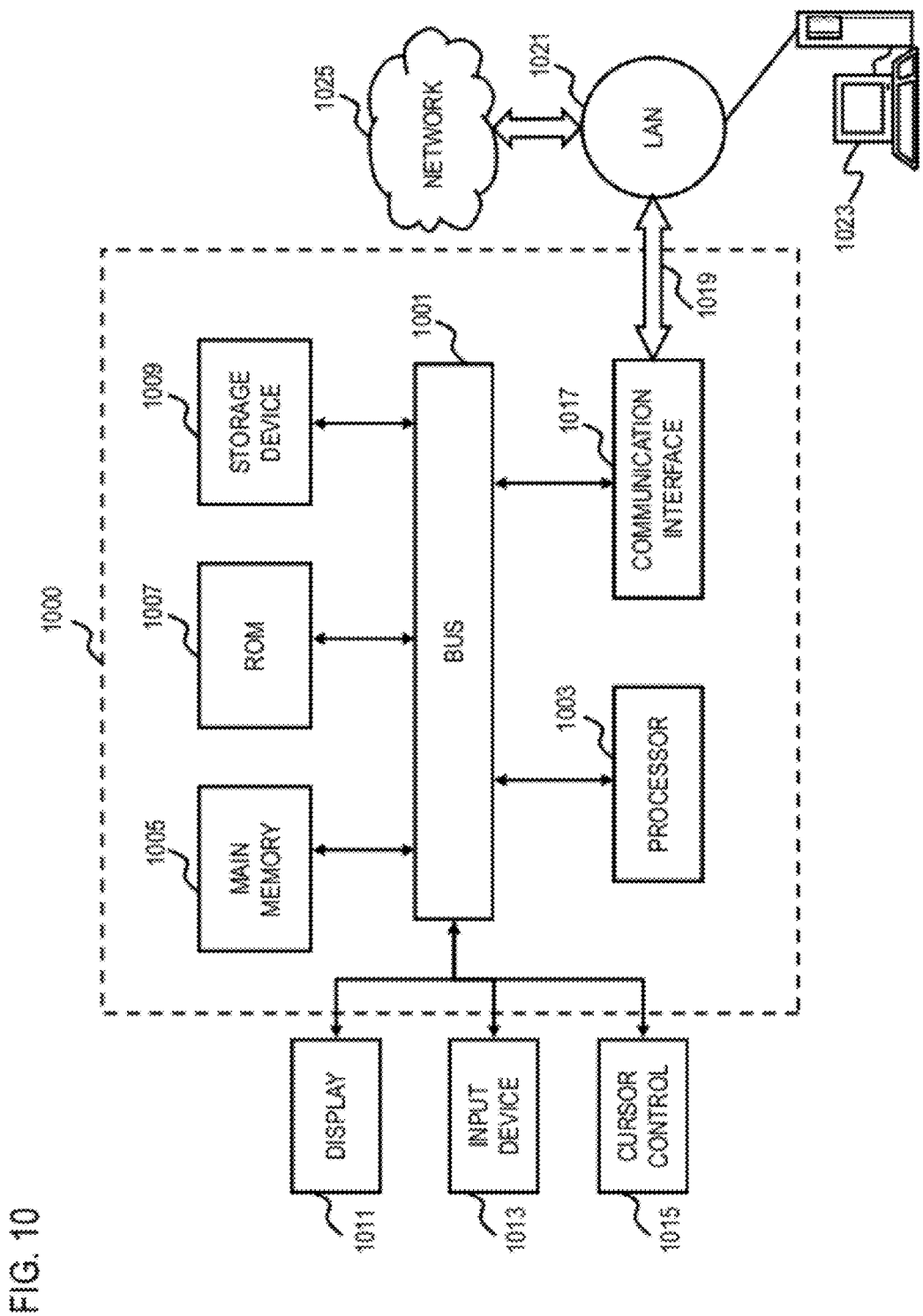
FIG. 10 is a diagram of a computer system that can be used to implement various exemplary embodiments.

FIG. 10 illustrates computing hardware (e.g., a computer system) upon which an embodiment according to the invention can be implemented to initiate a service observing session over a network. The computer system 1000 includes a bus 1001 or other communication mechanism for communicating information and a processor 1003 coupled to the bus 1001 for processing information. The computer system 1000 also includes a main memory 1005, such as random access memory (RAM) or other dynamic storage device, coupled to the bus 1001 for storing information and instructions to be executed by the processor 1003. The main memory 1005 also can be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in the main memory 1005. Such instructions can be read into the main memory 1005 from another computer-readable medium, such as the storage device 1009. Execution of the arrangement of instructions contained in the main memory 1005 causes the processor 1003 to perform the process steps described herein. One or more processors in a multi-processing arrangement may also be employed to execute the instructions contained in the main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, the communication interface 1017 may be a local area network (LAN) card (e.g. For Ethernet™ or an Asynchronous Transfer Model (ATM) network) to provide a data communication connection to a compatible LAN. Wireless links can also be implemented. In any such implementation, the communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 9, multiple communication interfaces can also be employed.

The network link 1019 typically provides data communication through one or more networks to other data devices. For example, the network link 1019 may provide a connection through a local network 1021 to a host computer 1023, which has connectivity to a network 1025 (e.g. A wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as the main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
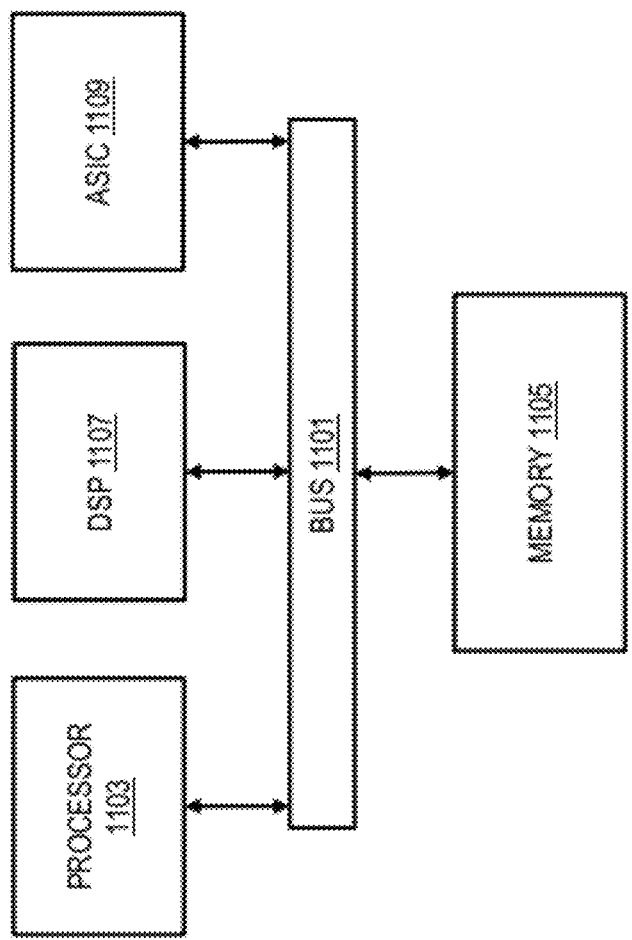
FIG. 11 is a diagram of a chip set that can be used to implement various exemplary embodiments.

FIG. 11 illustrates a chip set 1100 upon which an embodiment of the invention may be implemented. The chip set 1100 is programmed to initiate a service observing session as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. The chip set 1100, or a portion thereof, constitutes a means for performing one or more steps of FIGS. 3-5.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set top box based on device events. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   tracking, via at least one processor, a number of concurrent service observing sessions to an automatic call distributor, wherein each of the service observing sessions is established for a user to monitor a voice call involving an agent;
   selectively restricting, via the at least one processor, the number of concurrent sessions based on a predetermined restriction criterion;
   initiating at least one of the service observing sessions based at least in part on a predetermined business rule, a predetermined third cart resource restriction, or a combination thereof;
   receiving data from the automatic call distributor for applying the business rule, the third party resource restriction, or the combination thereof, wherein the data includes call detailed records, internet protocol detail records, or a combination thereof; and
   transmitting a command to the automatic call distributor for initiating the at least one of the service observing sessions.

2. A method of claim 1, wherein the predetermined third party resource restriction is applicable to a communication service provider across one or more hardware resources, software resources, or a combination thereof.

3. A method of claim 1, further comprising:
   monitoring voice calls at the automatic call distributor for a triggering event of at least one of the service observing sessions, the triggering event being defined based on the business rules, the third-party resource restriction, or the combination thereof; and
   detecting the triggering event,
   wherein the restriction of the number of concurrent sessions is subject to the predetermined third party resource restriction.

4. A method of claim 3, further comprising:
   initiating the at least one service observing sessions by the user based on the detected triggering event.

5. A method of claim 1, further comprising:
   receiving a service observing session request from the user to establish a corresponding service observing session; and retrieving data relating to a corresponding agent and the user based on the request.

6. A method of claim 5, further comprising:
applying a business rule, a third-party resource restriction, or a combination thereof on the data; and
determining whether to initiate or terminate a service observing session on the agent based on the application.

7. A method of claim 1, wherein the predetermined restriction criterion is specified by a third party, the method further comprising:
determining a priority for the predetermined restriction criterion; and
applying the predetermined restriction criterion according to the determined priority and tracking, in real-time, status of compliance thereof.

8. A method of claim 7, further comprising:
detecting a unused or underutilized third party resource; and
determining a new third party resource restriction for the unused or underutilized third party resource.

9. An apparatus comprising:
at least one processor; and
at least one memory including computer program code for one or more programs,
the at least one memory and the computer program code configured to, with the at least one processor, cause the apparatus to perform at least the following,
track a number of concurrent service observing sessions to an automatic call distributor, wherein each of the service observing sessions is established for a user to monitor a voice call involving an agent,
selectively restrict the number of concurrent sessions based on a predetermined restriction criterion,
initiate at least one of the service observing sessions based at least in part on a predetermined business rule, a predetermined third party resource restriction, or a combination thereof,
receive data from the automatic call distributor for applying the business rule, the third party resource restriction, or the combination thereof, wherein the data includes call detailed records, internet protocol detail records, or a combination thereof; and
transmit a command to the automatic call distributor for initiating the at least one of the service observing sessions.

10. An apparatus of claim 9, wherein the predetermined third party resource restriction is applicable to a communication service provider across one or more hardware resources, software resources, or a combination thereof.

11. An apparatus of claim 9, wherein the apparatus is further caused to:
monitor voice calls at the automatic call distributor for a triggering event of at least one of the service observing sessions, the triggering event being defined based on the business rules, the third-party resource restriction, or the combination thereof; and
detect the triggering event,
wherein the restriction of the number of concurrent sessions is subject to the predetermined third party resource restriction.

12. An apparatus of claim 11, wherein the apparatus is further caused to:
initiating the at least one service observing sessions by the user based on the detected triggering event.

13. An apparatus of claim 9, wherein the apparatus is further caused to:

receiving a service observing session request from the user to establish a corresponding service observing session; and
retrieve data relating to a corresponding agent and the user based on the request.

14. An apparatus of claim 13, wherein the apparatus is further caused to:
apply a business rule, a third-party resource restriction, or a combination thereof on the data; and
determine whether to initiate or terminate a service observing session on the agent based on the application.

15. A system comprising:
an automatic call distributor; and
a call center manager configured to:
track a number of concurrent service observing sessions to the automatic call distributor, wherein each of the service observing sessions is established with a user to monitor a voice call by the corresponding user, and at least one of the service observing sessions is initiated via a web-based application; and
selectively restrict the number of concurrent sessions based on a business rule, a predetermined third party resource restriction, or a combination thereof;
initiate at least one of the service observing sessions based at least in part on the predetermined business rule, the predetermined third party resource restriction, or the combination thereof,
receive data from the automatic call distributor for applying the business rule, the third party resource restriction, or the combination thereof, wherein the data includes call detailed records, internet protocol detail records, or a combination thereof; and
transmit a command to the automatic call distributor for initiating the at least one of the service observing sessions.

16. A method comprising:
tracking, via at least one processor, a number of concurrent service observing sessions to an automatic call distributor, wherein each of the service observing sessions is established for a user to monitor a voice call involving an agent;
selectively restricting, via the at least one processor, the number of concurrent sessions based on a predetermined restriction criterion;
determining a priority for the predetermined restriction criterion; and
applying the predetermined restriction criterion according to the determined priority and tracking, in real-time, status of compliance thereof.

17. An apparatus comprising:
at least one processor; and
at least one memory including computer program code for one or more programs,
the at least one memory and the computer program code configured to, with the at least one processor, cause the apparatus to perform at least the following,
track a number of concurrent service observing sessions to an automatic call distributor, wherein each of the service observing sessions is established for a user to monitor a voice call involving an agent,
selectively restrict the number of concurrent sessions based on a predetermined restriction criterion,
initiate at least one of the service observing sessions based at least in part on a predetermined business rule, a predetermined third party resource restriction, or a combination thereof, monitor voice calls at the automatic call distributor for a triggering event of at least one of the service observing sessions, the triggering event being defined based on the business rules, the third-party resource restriction, or the combination thereof; and
detect the triggering event,
wherein the restriction of the number of concurrent sessions is subject to the predetermined third party resource restriction.

* * * * *